United States Patent [19]
Bang et al.

[11] Patent Number: 5,956,456
[45] Date of Patent: Sep. 21, 1999

[54] APPARATUS AND METHOD FOR DISPLAYING GUIDE PROGRAM DATA FROM A CASSETTE TAPE

[75] Inventors: Keuk Young Bang, Kyungki-do; Se Yong Ro, Seongnam, both of Rep. of Korea

[73] Assignee: LG Electronics Inc., Seoul, Rep. of Korea

[21] Appl. No.: 08/677,505

[22] Filed: Jul. 10, 1996

[30] Foreign Application Priority Data

Jul. 10, 1995 [KR] Rep. of Korea .................. 20227/1995

[51] Int. Cl.[6] ............................... H04N 5/91; H04N 5/44
[52] U.S. Cl. .............................. 386/83; 348/734
[58] Field of Search .................. 386/83, 46, 92, 386/109, 1, 27; 360/32, 39; 348/734; H04N 5/91, 5/44

[56] References Cited

U.S. PATENT DOCUMENTS

| | | |
|---|---|---|
| 4,689,740 | 8/1987 | Moelands et al. . |
| 5,390,027 | 2/1995 | Henmi et al. ............................. 386/83 |
| 5,488,409 | 1/1996 | Yuen et al. . |

OTHER PUBLICATIONS

Hitachi brochure published on Aug. 31, 1994 relating to a VCR.

*Primary Examiner*—Robert Chevalier

[57] ABSTRACT

A method and apparatus for displaying program guide data for individual videotape cassettes without a videotape recorder. The apparatus and method includes a remote controller, which can function as a conventional controller, but also can interface without a memory in a tape cassette for displaying stored program data.

3 Claims, 3 Drawing Sheets

| DATE | BROADCAST SOURCE | CHANNEL | TITLE | ABSTRACT | RECORDING TIME |
|---|---|---|---|---|---|
| 95.1.10 | NBC | 12 | | | 30 MIN. |

APPARATUS AND METHOD FOR DISPLAYING GUIDE PROGRAM DATA FROM A CASSETTE TAPE

BACKGROUND OF THE INVENTION

The present invention relates to an apparatus and method for displaying guide program information from a memory in a videotape cassette which is capable of storing a plurality of video programs.

FIG. 1 shows a conventional system for recording a plurality of programs with program guide data on a videotape cassette. A program recording device 20 is connected to an antenna 28 for receiving a program to be recorded on the tape cassette 2. In the illustrated system, the program recording device 20 is a videotape cassette recorder (VCR).

The recording device 20 has a video signal recorder 21 that accepts a signal from the tuner 25 and records the program on the tape cassette 2. In the illustrated VCR, the video program is recorded on a magnetic tape 29. The program recording device 20 has the capability of recording a plurality of VCR programs separately on the magnetic tape 29.

The tuner 25 is also connected to a microprocessor 22. The microprocessor 22 receives program data from the tuner 25 which is stored as part of the program guide data in memory 24.

Once processed by the microprocessor 22, the data stored in the memory 24 is recorded in the storage portion 9 of the tape cassette 2. The storage portion 9 is a separate memory storage unit from the magnetic tape 29. In one system, the cassette tape 2 is a videotape cassette with a built-in non-volatile memory commonly referred to as a "MIC."

The program guide information data in memory 24 is mirrored in the storage portion 9 of the recording medium 2. Upon completion of the recording of a program or programs, the microprocessor 22 copies the contents of memory 24 through an I²C bus 26 to the storage portion 9. The I²C transfer method is generally described in U.S. Pat. No. 4,689,740.

Additional program guide data may be manually inputted by the user into the program guide data stored in memory 24 using key input 23. This enables the user to greatly expand the information which appears in the program guide that is later displayed.

FIG. 2 shows an example of the type of program guide information which may be recorded and displayed. As discussed briefly above, this data may be either automatically inputted from the tuner 25 or manually entered by the user through the key input 7. Additionally, several television program broadcast signals now include information such as the title of the program and the recording time that can be automatically placed in the program guide data. One such service is known by the service mark "VCR Plus."

Without some form of indexing function, the user must manually scroll through the tape to learn the videotape's contents. This obviously requires much time and effort. Two basic approaches have been used in conventional VCR's to simplify this process.

First, an index signal may be selectively recorded with each program resident on the videotape. This enables the user to more quickly and sequentially scan through the videotape from index to index in viewing the contents of the memory. Alternatively, the VCR may generate a guide program after scanning the tape. This general approach is both time consuming and cumbersome for the user since the tape must be processed in order to learn the contents of the cassette.

Second, a related approach uses indexing on the videotape while maintaining a guide program in a separate memory of the cassette tape. In such an apparatus and method, the title, location and length of a program is recorded in a memory resident within the cassette tape. This approach has an inherent problem in that the memory can be read only when the cassette tape is loaded in the VCR. As a result, the user cannot know the index information without first loading the tape into the VCR.

SUMMARY OF THE INVENTION

Referring to the problems of the conventional art, an object of the invention is to provide an apparatus and method for efficiently displaying guide program data reflecting the contents of a videotape cassette tape.

A further object of the present invention is to provide an apparatus and method for conveniently displaying guide program data from a videotape cassette capable of storing a plurality of VCR programs.

It is a further object of the present invention to provide an apparatus and method for displaying guide program data before execution of the playback mode for enabling a user to know the contents of the recording medium without having to scan the video cassette tape.

To effect the above objects, the present invention is directed to a method and apparatus for displaying a program guide for individual cassette tapes. Each cassette tape having a separate memory for storing program guide data which enables the contents of the cassette tape to be quickly and efficiency accessed.

The system includes an apparatus having a display device for interfacing with a videotape cassette to display the program guide information. The display system includes a microprocessor for controlling operation of the system; a transfer mechanism for interfacing with the tape cassette in transferring program guide information stored on the cassette; a program guide memory for storing program guide data received from a cassette through the transfer mechanism; and a display for displaying the program guide data for a cassette as stored in the program guide memory. Such a system enables the program guide for an individual videotape cassette to be displayed without scanning the remainder of the device and without having to use a VCR.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE ATTACHED DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENT

With reference to the attached drawings, a preferred embodiment of the invention will be described in detail.

Figures 1, 2:
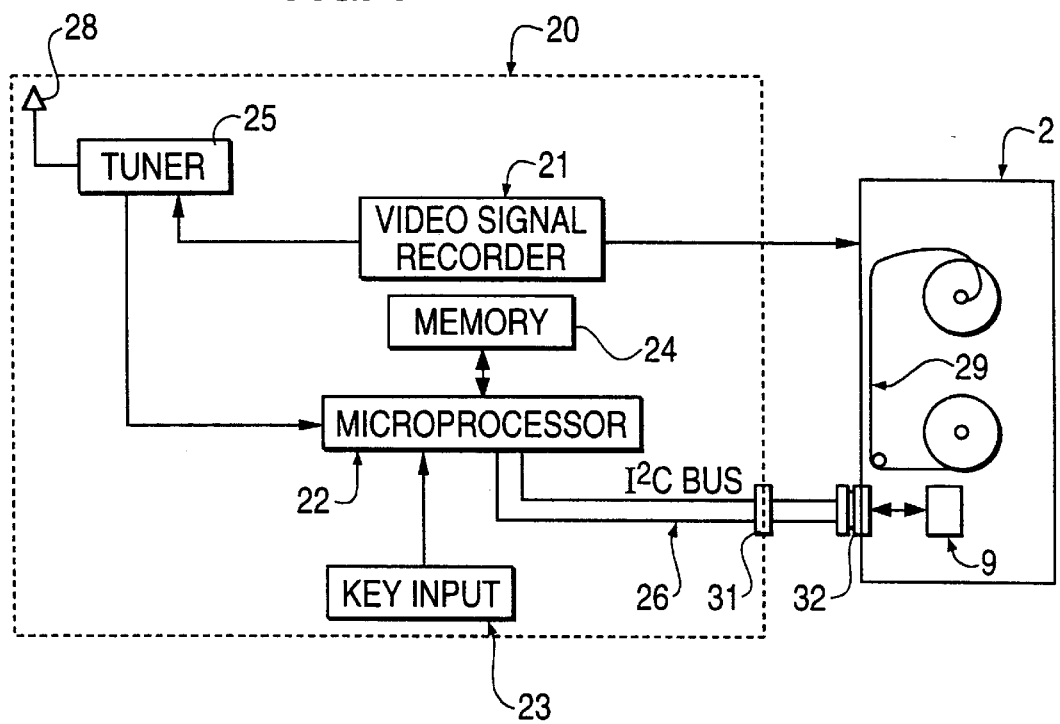
FIG. 1 is a schematic diagram of a conventional program guide data storing system.
FIG. 2 illustrates an example of a conventional program guide data format.
Figure 3:
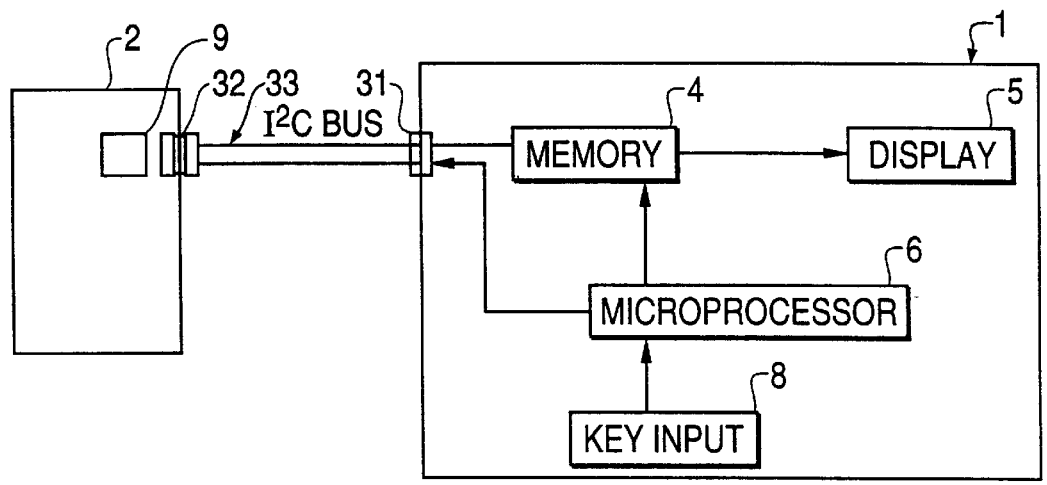
FIG. 3 is a schematic diagram of a conventional program guide data display system.

FIG. 3 shows a system for displaying a program guide which is stored on the storage portion 9 of a videotape cassette 2.

The display apparatus 1 includes a memory 4, a display device 5, a microprocessor 6 and a key input 8. The microprocessor 6 controls the internal operations of the display apparatus 1. The microprocessor 6 is manually controlled using the key input 8 to process and to display program guide data from the data received from the tape cassette 2.

A transfer device 33 links the cassette tape 2 and the display apparatus 1 for communicating the program guide data stored in the storage portion 9 to the display apparatus 1 in response to the microprocessor 6. The microprocessor 6 causes the contents of the storing portion 9 to be mirrored on the memory 4 for later display.

In one embodiment, the operator may easily edit or add information to the program guide data stored in the memory 4 using the key input 8 of the display device 1. The microprocessor 6 accepts the editing data from the key input 7 and modifies the program guide data. Once the editing process is completed, the contents of the memory 4 are recorded on the storage portion 9 of the cassette 2.

Figure 4:
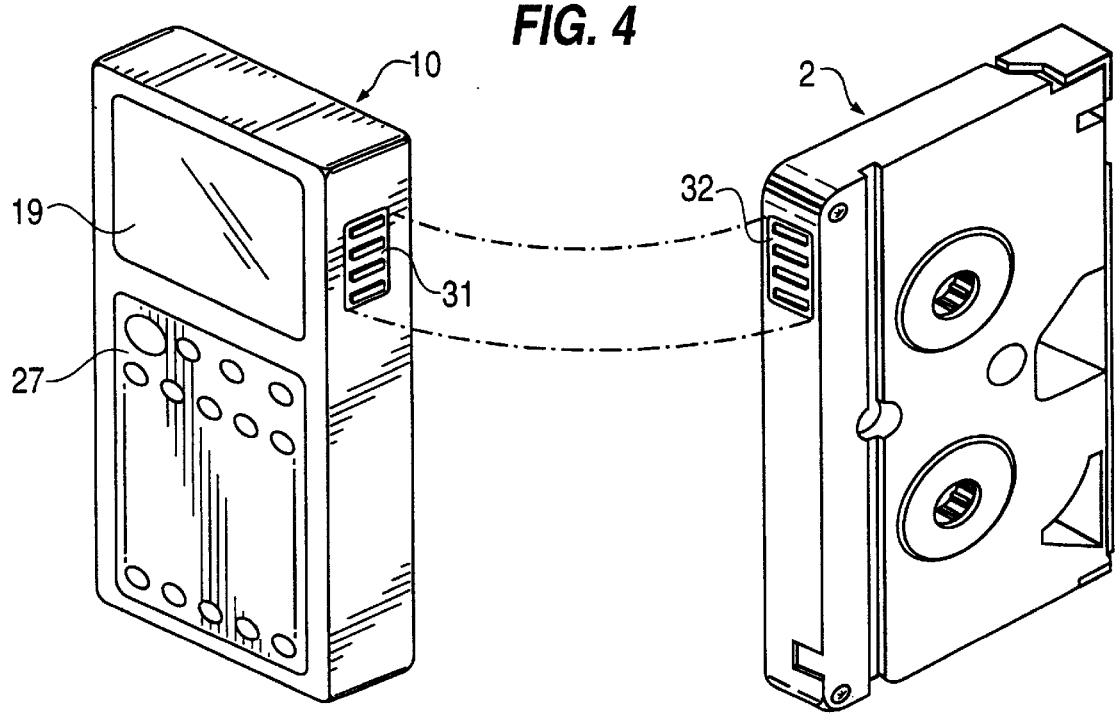
FIG. 4 illustrates one embodiment of a remote controller display system according to a preferred embodiment of the present invention.

FIG. 4 illustrates one preferred embodiment of the present invention using a remote controller 10 as the display device 1 which is capable of interfacing with a MIC (memory in cassette) in a cassette tape 2.

The remote controller 10 and the cassette tape 2, respectively, have input/output means 31 and 32 on their external faces which collectively form the transfer device 33. The input/output device 32 in the tape cassette 2 is recessed along one edge of the casing and the input/output device 31 in the remote controller 10 protrudes slightly above one edge to contact with the input/output device 32 of the tape. Here, communication between the input/output devices 32 and 31 is performed using the I²C interface method.

The remote controller 10 has a display 5 that may be used to display many types of information particularly including the program guide data. The keypad 27 is used as the key input 8 to control the microprocessor 6 functions and input certain program information as discussed above.

Figure 5:
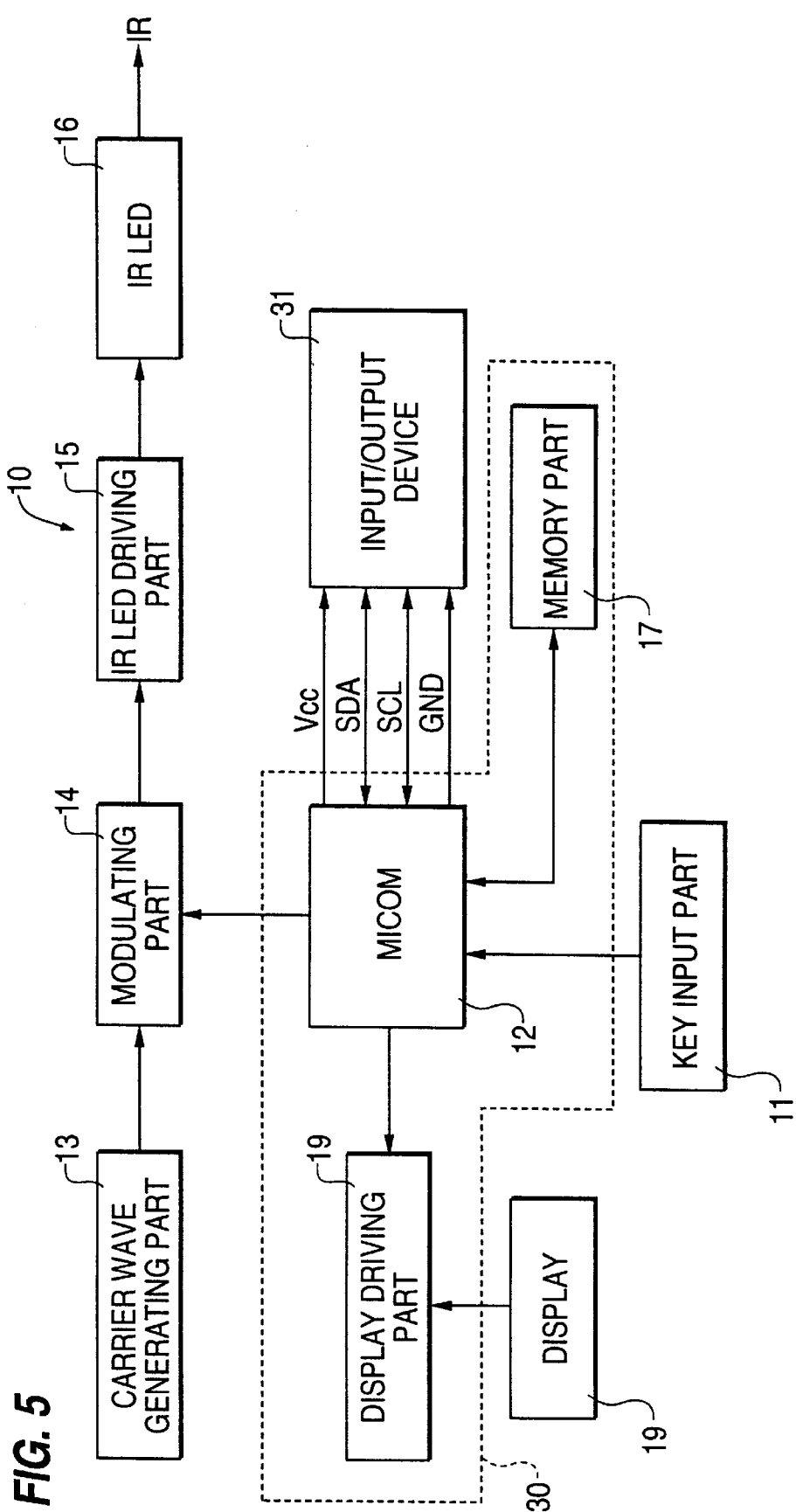
FIG. 5 is a schematic diagram of a remote controller display system according to preferred embodiment of the present invention.

With reference to FIG. 5, the remote controller 10 includes a key-input part 11 (that includes keypad 27), a microcomputer (MICOM) 12, a carrier wave generating part 13, a modulating part 14, an infrared ray (IR) light emitting diode (LED) driving unit 15, and an infrared ray LED 16. In the thus-structured remote controller 10, when a user inputs a key through the key-input part 11, the MICOM 12 outputs a data pulse corresponding to the input key to the modulating part 4. The carrier wave generating part 13 outputs a carrier wave to the modulating part 14. Accordingly, the modulating part 14 modulates the data pulse from the MICOM 12 according to a carrier wave, and outputs the signal to the IR LED driving part 15. The IR LED driving part 15 amplifies the input modulating signal and outputs it to the IR LED 16. And then, the IR LED 6 converts the electric signal into an infrared signal, and emits the signal into the air toward the unit to be controller (not shown) similar to conventional remote controllers.

Unlike conventional devices, the remote controller 10 has a read function that is initiated by the key input part 11. Here, the program guide data reading device 30, including the microcomputer (MICOM) 12, reads out the program guide data from the input/output device 31. A memory part 17 stores the program guide data read out from the MICOM 12. A display driving part 19 is driven to display the stored data.

When the remote controller 10 performs general operations, (for example, if a user inputs a key for operating a VCR through the key input part 11), the MICOM 12 determines which functions correspond to the key input and outputs a data pulse corresponding to the key input to the modulating part 14.

The carrier wave generating part 13 generates a carrier wave and then outputs it to the modulating part 14. The modulating part 14 modulates the data pulse from the MICOM 12 of the program guide data reading means 30 according to the carrier wave signal, and outputs the modulated signal to the IR LED driving part 15.

The IR LED driving part 15 amplifies the input modulating signal, and outputs it to the IR LED 16. The IR LED 16 converts the electric signal into an IR, and then emits it into the air toward a unit to be controlled (not shown).

If the user wants to see the program guide data, the input/output device 31 of the remote controller is placed in contact with the I/O device 32 of a cassette tape 2. The MICOM 12 of the program guide data reading device 30 then determines if the Vcc terminal is opened or not, reads the contents of the data using a serial data line (SDA) and serial clock line (SCL) in case of connecting the Vcc terminal, controls the display driving part 19 to display the contents of the storage portion 9 on the display 19, and then stores the contents of the storage portion 9 on the memory part 17.

If the user wants to see the program guide for the tape, a command is inputted by the user using the key input part 11 to output the contents of the memory part 17, the MICOM 12 reads the corresponding contents from the memory part 17 and displays it on the display 19.

As described above, the present invention allows the program guide for a videotape cassette to be displayed on the remote controller without having to possess a VCR and to load the tape cassette into a VCR, if one is available.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wireless remote control for displaying program guide information from a videotape cassette, capable of recording a plurality of video programs and having a program guide memory for storing program guide data, said wireless remote control comprising:

a display;

means for effecting remote control of an external device;

means for inputting remote control data;

means for interfacing with the program guide memory of a videotape cassette without use of a conventional VCR;

control means, in communication with the interface means and said input means for detecting program guide data and remote control data, for selectively causing the detected program guide data to be displayed on said display and for causing said remote control means to execute a remote control based on said remote control data.

2. A wireless remote control as recited in claim 1, further comprising:

program guide data storage means for storing program guide data detected by said control means.

3. A wireless remote control as recited in claim 1, wherein said control means is a microcomputer.

* * * * *